United States Patent

[11] 3,602,754

| [72] | Inventors | Lawrence V. Pfaender<br>Toledo;<br>Wolfgang W. Bode, Sylvania; Glenn H.<br>Dunlap, Maumee; Anthony M. Kobylak,<br>Rossford; Raymond S. Richards, Toledo, all<br>of, Ohio |
|---|---|---|
| [21] | Appl. No. | 819,641 |
| [22] | Filed | Apr. 28, 1969 |
| [45] | Patented | Aug. 31, 1971 |
| [73] | Assignee | Owens-Illinois, Inc. |

[54] CAPILLARY TUBE GAS DISCHARGE DISPLAY PANELS AND DEVICES
11 Claims, 29 Drawing Figs.

[52] U.S. Cl. ....................................................... 313/108 B,
313/201, 313/220, 315/169 R, 340/166 R
[51] Int. Cl. ......................................................... H01j 11/02,
H01j 65/04

[50] Field of Search........................................... 315/160,
167, 169; 313/108, 108 B, 108 C, 109.5, 104, 201,
220; 340/166; 350/96

[56]  References Cited
UNITED STATES PATENTS

| 2,933,648 | 4/1960 | Bentley ......................... | 315/169 |
| 3,265,892 | 8/1966 | Sheldon......................... | 350/96 X |
| 3,505,046 | 4/1970 | Phaneuf ........................ | 350/96 X |

Primary Examiner—Roy Lake
Assistant Examiner—E. R. La Roche
Attorneys—E. J. Holler and D. K. Wedding

ABSTRACT: There is disclosed a multiple discharge gas display/memory panel of the type in which filamentary or capillary size gas tubes or gas continuums are assembled and formed as a monolayer to form the gas discharge panel.

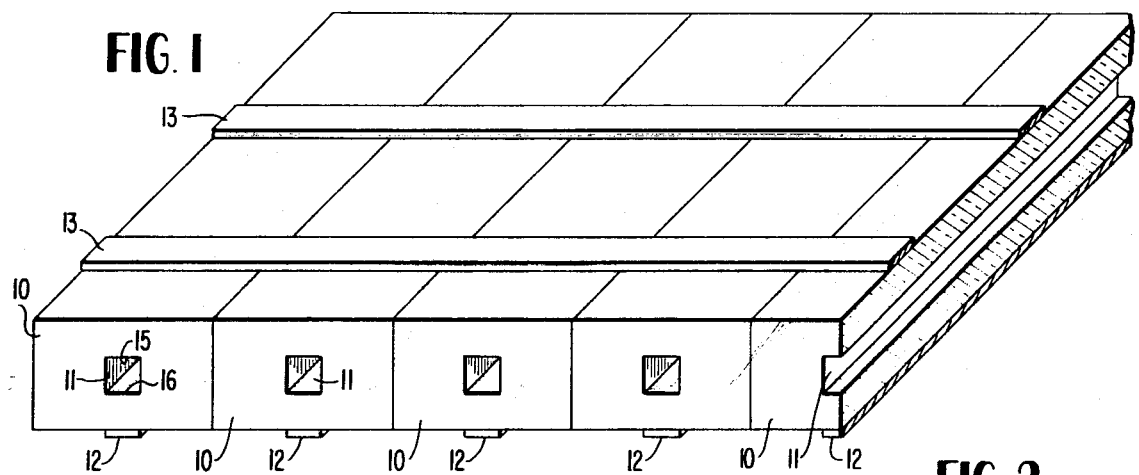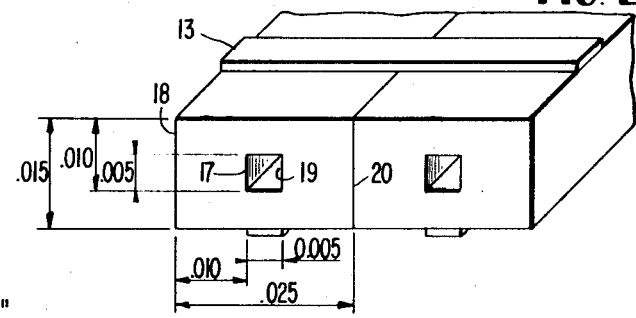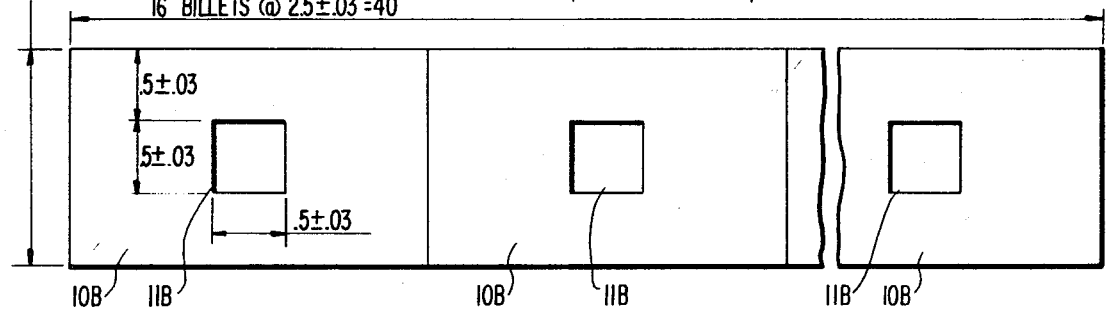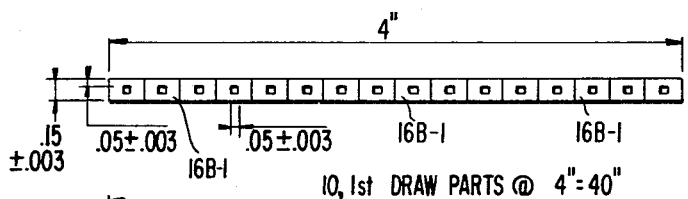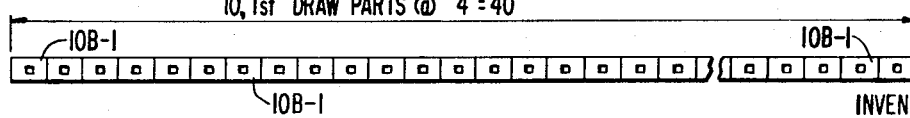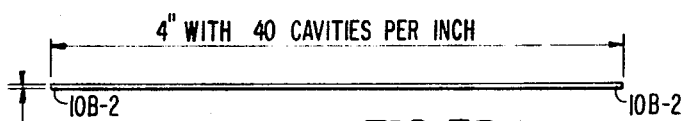

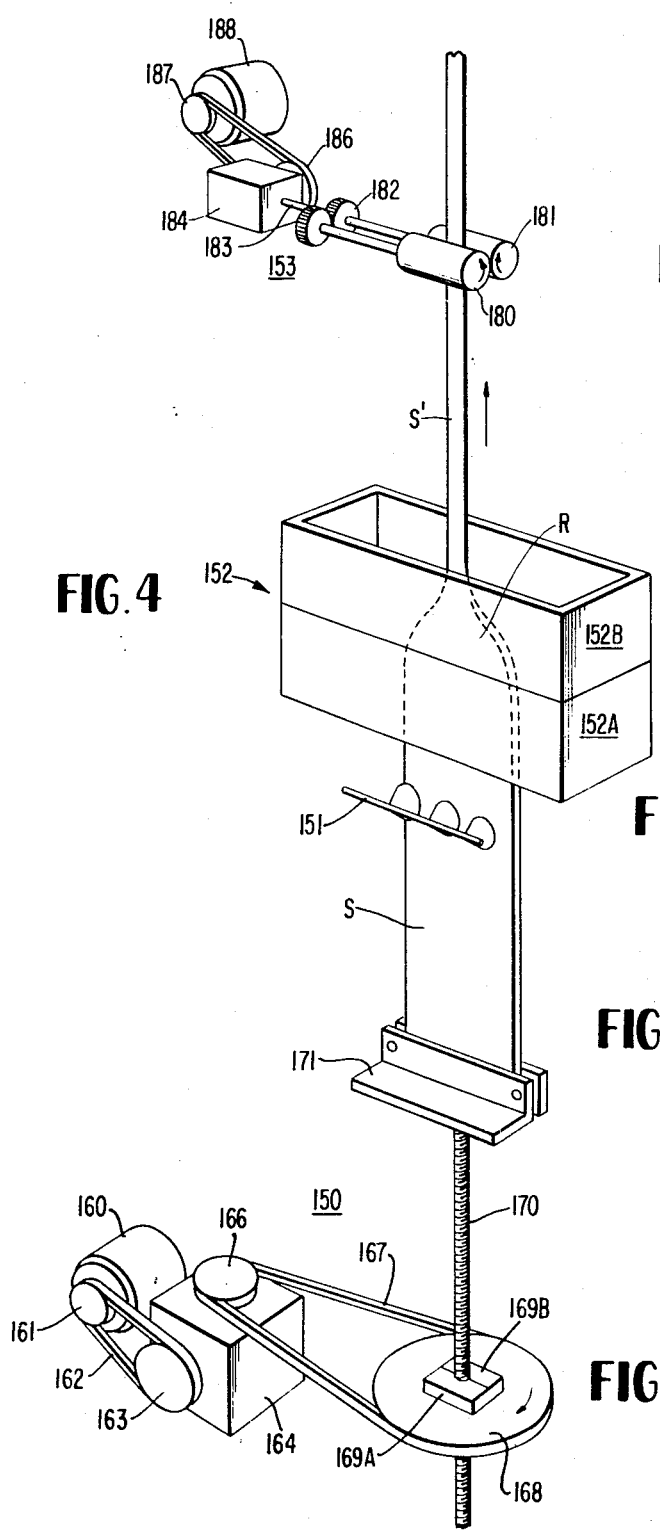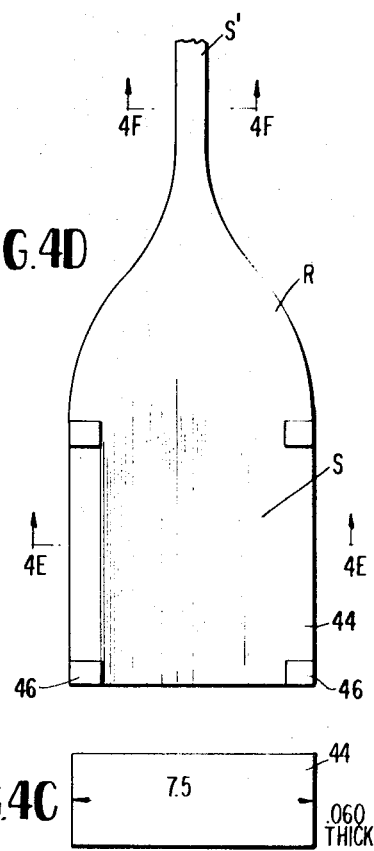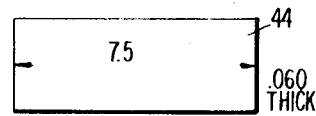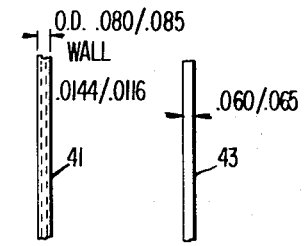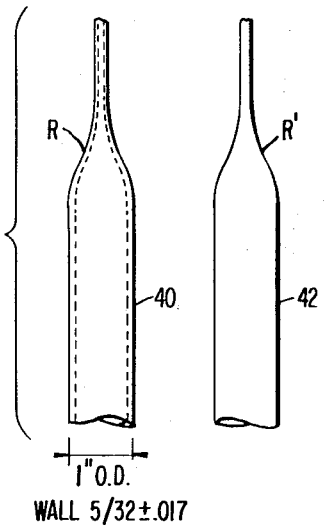

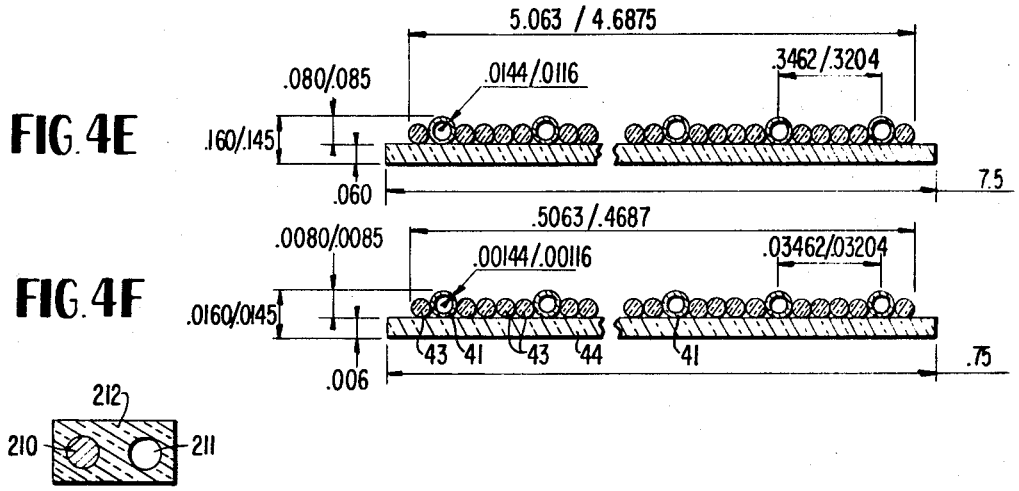
FIG.4E
FIG.4F
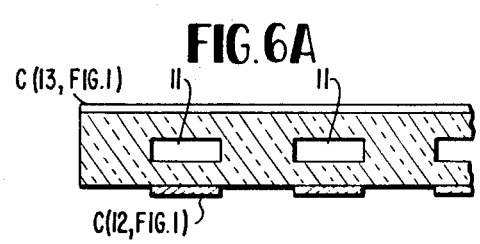
FIG.5
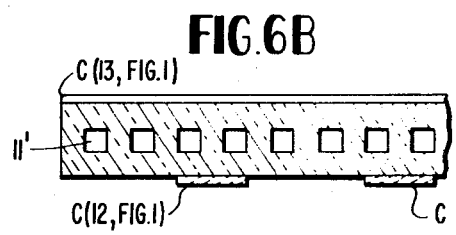
FIG.6A
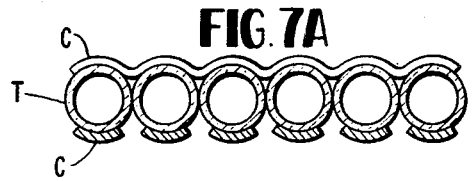
FIG.7A
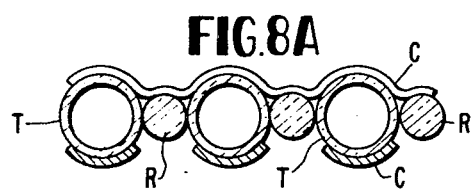
FIG.8A
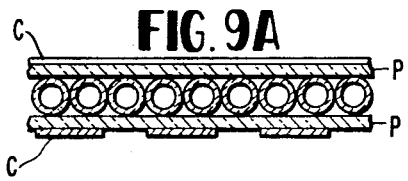
FIG.9A
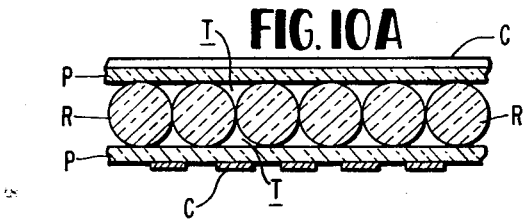
FIG.10A
FIG.6B
FIG.7B
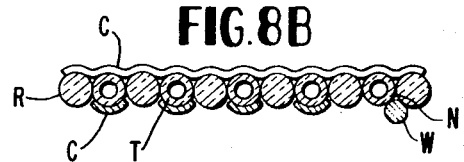
FIG.8B
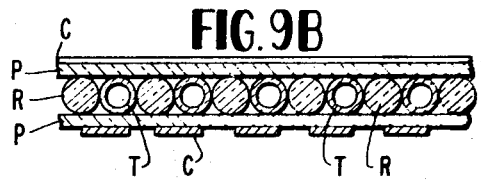
FIG.9B
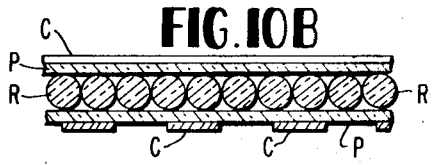
FIG.10B

CAPILLARY TUBE GAS DISCHARGE DISPLAY PANELS AND DEVICES

The present invention relates in general to methods of precision fabrication of complex glass structures, particularly gas discharge devices and more particularly relates to redraw processes for fabricating capillary gas discharge devices and complex glass structures produced thereby.

Glass redraw processes per se are well known in the art and have been used to form precision glass tubing, sheets and fiber bundles with complex cross sections, such as shown in an article by R. A. Humphrey, entitled "Forming Glass Filaments with Unusual Cross Sections," published by Gordon & Breach, New York, New York, proceedings of the 7th International Congress on Glass, Brussels, June 28 to July 3, 1965, Charkroi, Belgium pages 77–1 to 77–8. The present invention adapts the known redraw technique in a unique way to produce complex glass panel structures having high precision dimensions. For example, monolayer combinations of conventional glass structures such as tubes (round, rectangular, etc.), solid rods and plates (grooved, bored, etc.) and certain conductor arrays are formed in various complex panel units, subunits, etc. An important aspect of the process is that relatively large glass structures having complex cross-sectional configurations, corresponding to the complex cross-sectional configurations in the final product or panel device may be easily formed to desired dimensions. During the redrawing or stretching process all cross-sectional dimensions and areas can be uniformly reduced while the percent tolerance remains constant. Thus, for purposes of illustration, a 1-inch dimension having a tolerance of 1 percent e.g., ±0.01 inch, in a 10 to 1 reduction results in a 0.1 inch dimension and a tolerance of ±0.001 inch. A further 10 to 1 reduction results in a 0.01 inch dimension and a tolerance of ±0.0001 inch.

Tubular gas discharge chambers or continuums have been disclosed or otherwise suggested in the prior art, and while in some cases, such tubular gas discharge chambers have some similarity to structures disclosed herein, none has been capillary in the sense of the present invention in having precision internal diameter or discharge gaps of less than about 0.010 inch and larger in some cases with precision of thin glass walls of about 0.001 inch in thickness, such precision being a requisite for gas discharge devices having a memory characteristic obtained through storage of charges on wall surfaces. Hence, such prior art disclosures as U.S. Pat. No. 3,050,654 to Toulon and U.S. Pat. No. 1,867,340 to Weinhart et al. for example (there being many others), while disclosing gas discharge panels formed of an assembly or array of gas filled tubes having external electrodes or conductors, such devices are neither constructed nor operated in the manner of the present invention in that such gas filled tube structures as are disclosed in the prior art have dimensions, operating frequencies and/or potentials applied thereto which are inconsistent with the structure and/or operating conditions of the gas discharge devices described herein.

Basic functional operating features and principles of the present invention are disclosed in U.S. Pat. No. 3,499,167 to Baker et al., in which a thin gas continuum or other chamber bounded by a thin dielectric coating on conductor arrays carried on relatively thick substrates or plate members, support a plurality of discrete, side-by-side gas discharges without any physical discharge is isolation members or structure in the thin gas chamber, such discharge isolation being effected, in part, due to the gas being at a pressure of sufficient magnitude to confine charges produced on discharge to within an elemental two dimensionally unconfined gas volume within which the discharges take place. Earlier disclosures of others disclosed generally similar "pulsing discharges" in so-called "mini cells" wherein a perforated thin glass sheet is used to provide physical confinement or isolation for discrete elemental gas discharges, and there has been suggestion of multiple "pulsing discharges" in a gas continuum.

Where large numbers of elemental gas discharge volumes are to be manipulated by common conductor systems, variations in discharge gap and/or dielectric can be sufficient to require different operating or discharge voltages for manipulating discharges. When such dimensional variations exceed design tolerances, some elemental discharge volumes are not properly manipulated. Moreover, effective operating voltages may likewise vary due to variation in dielectric thickness between the external conductors and the dielectric surface-gas medium interface. Significant advances have been made by the assignee of the present invention in providing solutions to these problems in the way of improvement materials, fabricating techniques, and gas compositions and pressures. The present invention, while incorporating the highly desirable feature of the Baker et al. patent in the elimination of the physical isolation structure such as a perforated center sandwich, provides an alternate structural approach or configuration in achievement of this feature.

In addition to the objective of providing a gas discharge display and memory device not having any perforated center sandwich or physical confinement of discrete elemental discharges as is achieved by the invention disclosed in the aforementioned Baker et al. application, the present invention has the additional objectives of providing methods of fabricating complex glass panel structures with a high degree of precision and at relatively low cost; the achievement of simpler, precision manufacture of gas discharge chambers and dielectric boundaries of same; the elimination of possible structural stresses due to fluctuation in ambient pressure differentials where high gas pressures are desired; the provision of novel methods of precision manufacturing display panels in large volumes and at relatively low cost; the provision of display units which may be very long compared to their width or vertical height so that a large number of alphanumeric characters may be "written" or displayed in a line, for example, full sentences, and the provision of various novel tube-rod conductor configurations.

The above as well as other objects, advantages and features of the invention will become apparent from the following specification and accompanying drawings wherein:

FIG. 1 is a partial perspective view of a gas discharge device constructed in accordance with the invention, and FIG. 2 is a portion of the structure shown in FIG. 1 with exemplary dimensions thereon;

FIG. 3A to FIG. 3D (essentially full scale) show the size reduction sequence to produce the device disclosed in FIGS. 1 and 2, FIG. 1 being a greatly enlarged view of the device shown in FIG. 3D (Because of the small size, the individual gas passages or continuums thereof do not appear in FIG. 3D.);

Figure 11A:
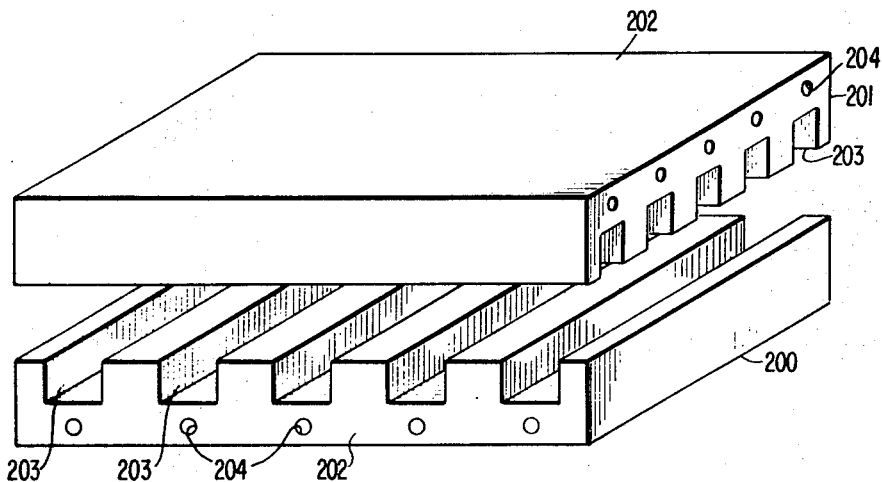
Figure 13:
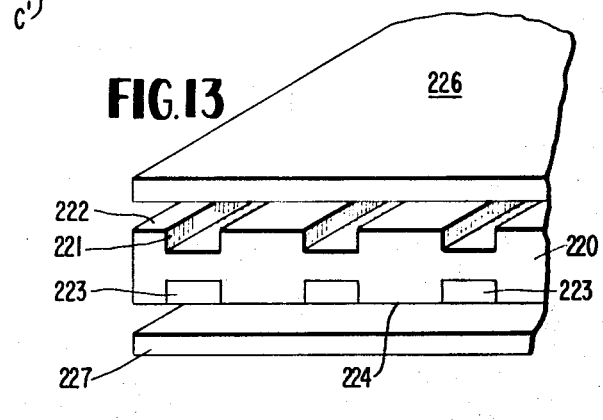

FIG. 4 discloses the selected elements of a conventional redraw apparatus which may be used to practice the process disclosed herein, FIG. 4A–FIG. 4F, inclusive, illustrating the fabrication sequence for one specific complex glass structure constructed according to the invention;

FIGS. 5, 6A and B–10A and B, inclusive, illustrate various novel tube-rod-plate-conductor units or subunits, greatly enlarged, constructed according to the invention; and FIGS. 11A and B–12A and B and FIG. 13, inclusive, illustrate complex grooved-bored-conductor plate structures constructed according to the invention.

With reference to FIG. 1, capillary tubes 10, rectangularly shaped in cross section, are arrayed in parallel side-by-side arrangement with the bores 11 of each capillary tube 10 being in a common plane. Each tube may be individually sealed or a gas manifold (not shown) may be used at the end of the tubes to permit gas pressure equalization. Each bore 11 is shown as being square having dimensions of 0.005 inch (5 mil) and on the lower external surface or side of each capillary tube 10 is conductor 12, each conductor 12 being aligned with bore 11 of its associated capillary tube 10. On the external surfaces of capillaries 10 are conductors 13 which are orthogonally related to conductors 12 to define a plurality of cross points or discharge units with the gas in capillary tubes 10. The discharge gaps, namely the distance between gas-glass interface 15 and gas-glass interface 16, are 0.005 inch (5 mil). The thickness of glass between conductor 13 in the gas-glass interface 15 is 0.005 inch (5 mil) as well as the thickness of the dielectric between conductor 12 and gas-dielectric interface 16. It will, of course, be appreciated, that the dimensions may be varied by selecting larger or smaller dimensions for the initial forms. It is desirable to make the thickness of glass and discharge gap as small as possible. With respect to electrical operating parameters, these are the critical dimensions which the present invention achieves with such precision that the discharge potentials applied to conductor 12 and any one of conductors 13 will be essentially uniform in the sense of not being affected by departures in dielectric thickness and/or discharge gaps defined by the spacing between the two gas-dielectric interfaces 15 and 16. The thickness of dielectric or glass capillary tubing walls 18 as well as the gas-dielectric interface 19 and wall 20 are noncritical electrically and in the embodiment disclosed are approximately 10 mils (0.010 inch) so that the spacing between bores 11 of capillary tubing 10 is approximately 20 mils (0.020 inch) which, is essence, defines the spacing between line of discharge units. More or less spacing may be incorporated as desired. The bores 11 are filled with a gas, such as a mixture of neon and nitrogen as disclosed in the aforesaid Baker et al. Patent or a mixture of neon and argon as disclosed in application Ser. No. 764,577 to Nolan, filed Oct. 2, 1968. The ends of the capillary tubes 10 may be sealed by a hot wire, for example.

Conductors 12 may be printed or otherwise applied on the external capillary surfaces, or may be wires secured to these surfaces. Alternatively, conductors 12 and 13 may be on separate plates (not shown) which are brought into intimate contact with exterior surfaces of capillary tubes 10, the only element of positioning precision required being with respect to the longitudinal orientation of conductors 12 with bores 11 of capillary tubes 10.

FIGS. 3A, 3B, and 3C, with exemplary dimensions shown thereon, show the precision with which the capillary and other structures of the present invention may be fabricated in a redraw process. For example, in order to construct the glass structures illustrated in FIG. 1, 16 cast glass billets 10B (shown in approximately full scale in FIG. 3A) are illustrated in a ground and polished starting condition in which the thickness of each billet is 1½ inches plus or minus 0.030 inch in width; the thickness of the glass walls between gas-glass interfaces 15B and 16B and exterior surfaces of the billet being one-half inch plus or minus 0.03 inch. In the event the billets are not ground and polished, the tolerances set forth above may be plus or minus 0.050 inch and this percentage or proportion of deviation will appear in the finished product. If wider spacing between capillary gas passages or bores 11 is desired, solid spacer rods may be interposed between billets having bores therein and reduced in the process. Sixteen such cast billets are arranged in a row approximately 40 inches in width, it being apparent that the length thereof, except for providing for redraw apparatus connection to the ends (which are discarded) thereof for the redraw process described later herein, is noncritical. As a general guide, for 10 to 1 reduction ratios, a 3-foot length of starting assembly will produce about 300 feet of panel blanks. The billets 10B arrayed as shown in FIG. 3A may be placed in an oven and heated to fuse the contiguous side edges of each billet to each other although this is not essential. The 16 cast billets 10B are placed in the redraw apparatus described later herein and redrawn to reduce the cross-sectional area of all dimensions equally in proportionate amounts and it will be noted that the tolerances are likewise reduced in precisely the same proportions so that by starting with high precision large numbers, the same accuracy or precision will appear in the final product. For example, the first redraw operation uniformly reduces all cross-sectional dimensions at a ratio of 10 to 1 so that the overall thickness of the billet is now 0.150 inch plus or minus 0.003 inch (a 10 to 1 reduction in the tolerance). The glass-gas interface dimension is likewise reduced from 0.50 inch plus or minus 0.03 inch to 0.050 inch plus or minus 0.003 inch, a similar reduction in scale. It will also be noted that the width of the 16 billets has been reduced from 40 inches to 4 inches. (Although not shown, square corners and other sharp angular edges are slightly rounded filets). FIG. 3D illustrates the final reduction to the desired dimension. In this instance, 10 of the assemblies shown in FIG. 3B are assembled in parallel side-by-side relationship for a second redraw operation. It will be appreciated that the product of the first drawing shown in FIG. 3B may be redrawn independently or any redraw of a plurality of such units. Furthermore, the individual billets may be redrawn, as described more fully hereinafter, all individually. It will be understood that more or less redrawing operations may be effected according to the desired dimension required in the final product. However, in the complex glass-metal structure disclosed herein metal-glass seal or bonding tends to limit the process to one redraw operation. It will be noted at this point that the original 16 cast billets 10B shown in FIG. 3A when reduced to the dimension shown in FIG. 3B and then reassembled with 10 such assemblies in an array as shown in FIG. 3C have 160 longitudinal semicapillary gas passages or bores 16B-1 so that in the final product illustrated in FIG. 3D, in which the 40-inch assembly shown in FIG. 3C has been reduced to a 10 to 1 ratio to a 4 inch width, there will be 40 capillary gas passages or bores 11 per inch. With reference now to FIG. 3D (which corresponds to FIG. 1), the redrawing of the assembly shown in FIG. 3C results in an overall thickness of 0.015 inch plus or minus 0.0003 inch. The thickness of the glass between gas-dielectric interface 15 to the outer surface of capillary tube 10 is 0.005 inch plus or minus 0.0003 inch and the dimensions of the bores 11 are 0.015 inch plus or minus 0.0003 inch. This uniformity and precision of the critical dielectric and gas discharge gap dimensions in the resulting product is achieved by essentially starting with large structures which may be closely controlled as to critical dimensions in the final product. Large numbers of display panel blanks may be assembled for larger display areas and are relatively immune from stress due to ambient pressure differentials.

The same degree of dimensional precision and manufacturing economy is effected in more complex panel structures disclosed herein, and will be described in connection with FIG. 4F in which hollow tubes, solid rods and a solid backup plate constitute the starting structures.

With respect to FIG. 4F the glass used for the rods and tubes may be KG–33 rod and tubes which is available from the assignee of the present invention. The backup plate may be chemically and heat resistant, laboratory glassware (as for example a composition containing 80.5 percent $SiO_2$, 12.9 percent $B_2O_3$, 3.8 percent $Na_2O$, 0.4 percent $K_2O$ and 2.2 percent $Al_2O_3$) which is available in sheet form of any desired thickness. To take most advantage of the redraw process in reducing tube, rod and backup plate including normal manufacturing tolerances, a large tube and rod diameter 1-inch outside diameter) was selected as being of optimum size. The process sequence in the final redraw product of FIG. 4F was as follows:

1. Redraw the 1-inch outside diameter rod to 0.060/0.065, a 16 to 1 reduction.
2. Redraw the 1-inch outside diameter tubing to 0.080/0.085, a 12 to 1 reduction.
3. Lay up 15 redrawn tubes (1) and 58 redrawn rods (2) on a 7½-inch wide sheet backup plate and oven fuse same.
4. Redraw the fused assembly to the desired width (approximately a 10 to 1 reduction).

This fabrication sequence is in part illustrated in FIGS. 4A to 4F with the size and theoretical tolerances shown at the various steps. The purpose of fusing the rods and tubes to the backup plate is to avoid slumping during the redraw process. Fusing temperature of about 1300° F. was found to be satisfactory with good fusion on all rods and tubes with no apparent slumping or deformation. This assembly was inserted in the

DESCRIPTION OF REDRAW APPARATUS AND METHOD

Figure 4 illustrates one form of essentially conventional redraw apparatus used in fabricating capillary gas discharge panels disclosed herein. This apparatus as illustrated is conventional and forms no part of the present invention. While FIG. 4 will be described in connection with redrawing the capillary tube-rod-backup plate assembly illustrated in FIG. 4F, it will be appreciated that except for minor modification to accommodate the different tube and/or rod configurations, the apparatus may be useful in redrawing all forms of discharge devices disclosed herein. As shown, the redraw apparatus includes a feed mechanism 150, preheat infrared lamps 151, multizone controllable furnace 152, and drawing mechanism 153. Feed mechanism assembly 150 includes a direct current motor 160 which is supplied from a conventional variable direct current supply (not shown) to vary the speed of motor 160. A pulley 161 on motor 160 is coupled by a drive belt 162 to pulley 163 on speed reducer gear assembly 164. The output of speed reducer mechanism 164 is taken from a pulley 166 which is coupled by belt 167 to wheel 168 which has a pair of threaded split nuts 169A and 169B to be rotated with wheel 168. A threaded rod 170 is meshed with teeth (not shown) in split nuts 169A and 169B so that when pulley 168 is rotated in the direction of the arrow, rod 170 moves upwardly at a controlled rate of speed. Clamp assembly 171 fixed to the upper end of rod 170 is thus moved upwardly at a controllable rate of speed. Clamp assembly 171 clamps the lowermost end of tube-rod-backup plate assembly S and feeds same upwardly in the direction of arrow illustrated. The upper end of the assembly S, after being heated to redraw temperature, is grabbed by a tong or clamp (not shown) and pulled upwardly beyond draw rolls 180–181, which are spread apart for this purpose to permit passage of the clamp.

Prior to entering the multistage or zone electric furnace 152, the assembly S is preheated by a bank of infrared lamps 151. Furnace 152 is conventional, and as shown consists of two separate heating stages 152A and 152B which are supplied from electrical alternating current supply (not shown) which may be adjustable to adjust the temperature in the furnace, and it will be apparent that the stages may be individually controlled so that the heat directed to the assembly S from front or back may be adjusted in any desired fashion. Suffice to say, multistage furnace 152 heats tube-rod-backup plate assembly S to a redraw temperature. In the example being described, this temperature is between the annealing point (KG–33 tube and rod and backup plate 565° C.) and the fiber softening point (KG–33 tube and rod 825° C., backup plate 820° C.), and was measured by a thermocouple spaced about one-half inch from the glass assembly S at zone R. The redraw assembly S' is pulled upwardly at a selected rate of speed by a pair of counterrotating draw rolls 180 and 181 by gear assembly 182. Redraw roll 181 is driven from the output shaft 183 of speed reducer assembly or mechanism 184 which in turn is driven by a pulley 186 belted to the drive pulley 187 on a second variable speed direct current motor 188. The variable speed motor 188 is supplied from direct current from a supply (not shown) and its speed may be adjusted for different draw rates and/or conditions as desired. Likewise, motor 160 may be adjusted in speed for different draw rates and/or draw conditions as desired. These speeds and the temperature of multistage of 152 may all be adjusted by conventional control apparatus in accordance with known redraw techniques and form no part of the present invention.

While the apparatus shown in Figure 10 is known in the art as an "up-draw" assembly, it will be appreciated that with due consideration for the effect of gravity on the softened glass the order may be reversed in that the feed mechanism 150 may be in the position of the redraw mechanism 153 so as to down draw the glass. Moreover, the redraw process may be applied horizontally or angularly. FIG. 4E illustrates the assembly S prior to redraw with exemplary dimensions given; 10 to 1 reductions in dimensions are preferred with a product yield of about 100 feet for each foot of starting assembly. After passing draw rolls 180, 181, the assembly is scored and severed to any desired length.

The current supplied to furnace 152 may be controlled by conventional thermocouples (not shown) or other temperature sensing devices (suitably located) and used to produce signals for controlling current to furnace heaters or otherwise controlling temperatures of the furnaces in a conventional manner. Obviously, other conventional forms of furnaces and temperature controls may be used.

In FIG. 4, zone R denotes the transition for a solid state to a plastic state and back to a solid state so that application of longitudinal tension will stretch or draw the tube-rod-backup plate assembly S uniformly and reduce the cross-sectional dimensions of all components of assembly S. All other adjustable parameters remaining fixed, the reduction rate may be set by the speed of draw rolls 180 and 181 and rate of feed of assembly S by feed screw rod 170. It can be seen that the differential of velocity between draw rolls 180 and 181 and feed screw rod 170 results in the application of the aforesaid longitudinal tension or drawing force to assembly S. Other apparatus may be used for applying drawing force or longitudinal tension to assembly S. In a less preferred way, the differential velocity may be maintained constant and the viscosity of the softened glass adjusted by increase of temperature to vary the draw rate.

Referring now to FIGS. 4A, 4B, 4C, 4D, 4E, and 4F, the specific process for assembling the tube-rod-backup assembly S of FIG. 10 will be described. As shown in FIG. 4A, glass tubing having a 1-inch outside diameter plus or minus 0.034 inch and wall thickness of 5/32 inch plus or minus 0.017 inch, in an initial or starting condition, is reduced or redrawn to a tube having an outside diameter between 0.080 inch to 0.085 inch and a wall thickness between 0.0144 inch and 0.0116 inch (a 12 to 1 reduction) as exemplified in the redraw tubing 41 shown in FIG. 4B. Similarly, rod 42 of FIG. 4A having a 1 inch outside diameter is reduced to a dimension of 0.060 and 0.065 inch (a 16 to 1 reduction) and the redrawn rod 43 is shown in FIG. 4B. It will be appreciated that greater or lesser reductions may be effected according to specific dimensions desired. Redraw tubes 41 and redraw rod 43 are assembled on plate 44 having a length corresponding to the length of the tubes and rods. Spacers 46 may be mounted at the corners or the edges of the plate 44 although this is not necessary. Preferably, prior to redraw, the tube-rod-plate assembly is placed in a fusing oven and heated to a temperature of about 1300° F. to fuse the contacting surfaces of tube-rod-plate assembly to each other to avoid slumping during the redraw process. A cross-sectional view of the tube-rod-backup plate assembly S prior to redraw is shown in FIG. 4E (exemplary dimensions being shown). This assembly comprises 15 redrawn tubes 41, 58 redraw rods 43, there being four rods 43 interposed between each tube 41 in the assembly with one additional rod 43A at each side of the terminal tubes 41T of the assembly. Rods 43 simply serve as spacers and may be eliminated if desired. After the reducing operation, performed by the apparatus shown in FIG. 4, the assembly S' is as appears in FIG. 4E, having been a 10 to 1 reduction in overall cross-sectional dimensions and a lengthening of the entire product or assembly. Thus, with reference to FIG. 4E, the 7½-inch wide backup plate has been reduced in width to 0.75 inch. The thickness of the backup plate 44 has been reduced from 0.06 inch to 0.006 inch. The width of the tube-rod-backup plate assembly has likewise been proportionately reduced from 5.063 inches (4.6785) to 0.5063 inch (0.4687). Furthermore, there has been a corresponding reduction in the center-to-center spacing of tubes 41. Thus, the 0.3462 (0.3204) center-to-center spacing of tubes 41 has been reduced proportionately to 0.03462 inch (0.03205) which amounts to a spacing per line of about 30 capillary discharge tubes per inch. Similarly, the cross-sectional dimension of each tube 41 as been proportionately reduced from the initial outside diameter of 0.080 inch (0.085) to 0.0080 inch (0.0085 inch) and the wall thicknesses of tubing 41 have been correspondingly reduced from 0.0144 inch (0.0116 inch) to 0.00144 inch (0.00116 inch).

From the foregoing specific examples, it can be seen that the redraw technique reduces the cross-sectional dimensions of tubing-rods-plates, etc., proportionate amounts whereas tolerances are reduced in the same direction so that precision tubing and dimensions are obtained. Obviously, more precise starting dimensions result in products having very high precision.

FIGS. 6A–10–B, inclusive, illustrate various other tube-rod-backup plate assemblies and configurations fabricated in accordance with technique of the present invention. Thus, FIG. 6A illustrates structures corresponding to FIG. 1 in which the capillary tubes are rectangular, the light emitting unit consists of a single bore 11 of a tube with the bore being the same size as the conductors C so that the unit excites or discharges within one bore. A departure from the unit illustrated in FIG. 6A is shown in FIG. 6B in which the applied conductors C are larger in width than the bore 11' of a capillary tube so that discrete gas volumes in several capillary tubes spanned by the width of the conductor C are excited or discharged. In other words, the "discharge" takes place within several contiguous bores of capillary tubing.

FIG. 7A illustrates the invention as applied to essentially round tubes and, like the embodiment illustrated in FIG. 6A, the bore of the capillary tube T is approximately the same size as or larger than the width of the conductors C applied thereto so that the discharge takes place within one capillary bore. FIG. 7B is similar to FIG. 6B in that the conductors C have a width spanning more than one capillary bore so that the discharge takes place within several capillary bores contiguous to one another.

In FIG. 8A, essentially round tubes are disclosed and tangential to each capillary tube is a solid rod of glass fiber R and the conductor C width, running longitudinal to the longitudinal length of the capillary tube, spans only one capillary tube so that the discharge takes place within one bore. In FIG. 8B, the spacer rods or solid fibers R have essentially the same diameter as the outside diameter of a capillary tube. In the above described round tube embodiments, instead of using printed conductors paralleling the longitudinal axes of the bores, small gauge wires W (about 1–1 mils) may be laid in the groove or notch N between a round tube and contiguous rod as shown at the right side of FIG. 8B. In this modification, the conductor wire W is off set so as to not block light emission from a discrete discharge to a viewer V.

In FIG. 9A, essentially round capillary tubes T are sandwiched between a pair of cover plates P. The structure illustrated without conductors C may be assembled with large tubes sandwiched between large cover plates and redrawn to desired dimensions as a single unit, after which conductors C may be applied to the exterior surfaces of the cover plate P. FIG. 9B shows a similar structure additionally having spacer rods R interposed between tubes T. Conductors C may span several tube bores for multiple discharges or single bores for single discharges. It will be appreciated that the tubes need not be contiguous or separated by solid spacer rods so as to leave open spaces between tubes.

In FIG. 10A and FIG. 10B, there are no capillary bores as such. These structures consist essentially of solid fiber rods R sandwiched between cover plates P, all of which have been redrawn as a unit. In these embodiments the discharge gas is located in the interstices I between rods R and the discharge is at the interstices I.

FIGS. 11A–13 illustrate the invention as applied to other complex cross-sectional configurations particularly adapted for gas discharge panels in which essentially rectangularly spaced glass sheets having nonglass geometrical shapes therein are redrawn to produce the structures illustrated. In FIG. 11A, the two halves 200 and 201 are identical. Each half is initially formed from a glass plate 202 having parallel grooves 203 sawn or otherwise formed therein, said grooves being essentially rectangular nonglass areas. Aligned with grooves 203 are conductors 204. Conductors 204 are attenuated in cross-sectional area simultaneously in the same proportion as the attenuation of the cross-sectional area of grooves 203. Such conductors may be indium metal or other conductive alloy or other suitable conductors which are liquid at glass drawing temperature of glass plate 202 and are placed in bores paralleling grooves 203 prior to redraw of the plate.

Figure 11B:
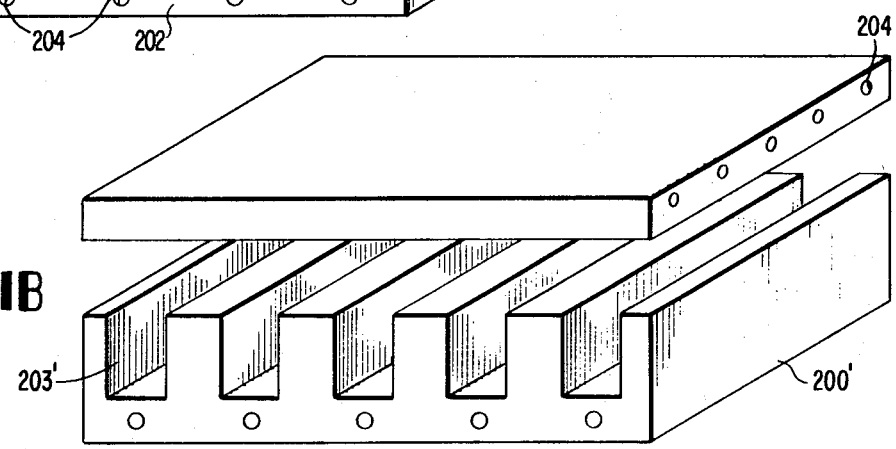

In the embodiment of FIG. 11A, the depth of grooves 203 are made one-half the discharge gap distance so that when the two halves 200 and 201 are assembled the discharge gap will equal groove intersections between plates 200 and 201. In FIG. 11B only one plate is grooved or channeled, the depth of the grooves 203 being equal to the discharge gap distance. Conductors 204' are formed in the manner described above. Complex glass-metal-capillary gas channel structures according to the invention need not necessarily involve multiple conductors and gas channels. For example, as shown in Figure 5, a single conductor 210 and a single parallel gas capillary passage 211 may be incorporated in an elongated glass member 212 and redrawn to the desired size and then assembled into larger units.

Figure 12A:
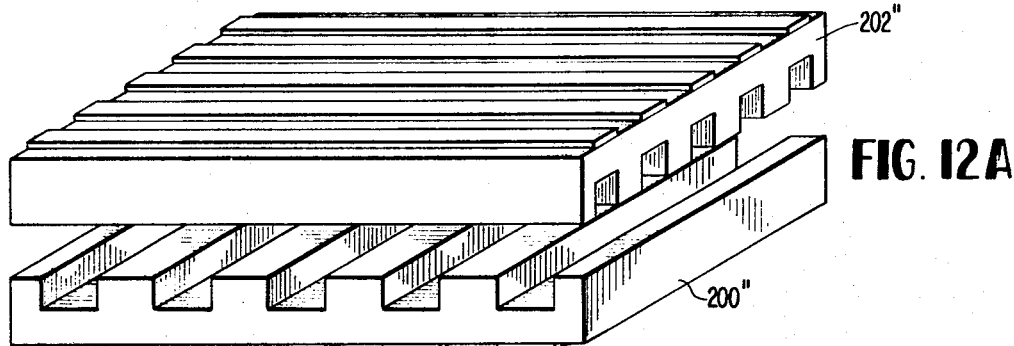
Figure 12B:
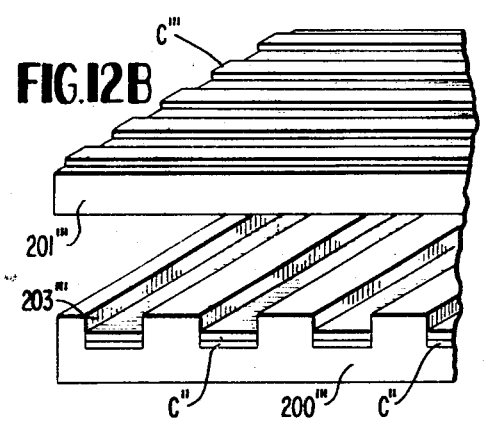

The structures illustrated in FIGS. 12A and 12B are similar to Figures 11A and 11B except the conductive members are applied after the redrawing to desired size of plate 200" and 201" FIG. 12A) and plates 200''' and 201'''' (FIG. 12B). In FIG. 12A, the conductors C are applied to external surfaces of plates 200" and 201" whereas in FIG. 12B, the conductors C'' are placed on the bottoms of grooves 203''', respectively, and have a thin dielectric coating applied over same.

In Figure 13, center plate 220 has formed therein parallel grooves 221 in one surface 222 and aligned grooves 223 in the opposite surface 224. Grooved plate 220 is sandwiched between viewing plate 226 and backing plate 227. Prior to redraw, grooves 223 are filled with indium or other conductive alloy which is liquid at glass drawing temperature. After redraw of this structure, as in earlier structures, a transverse transparent conductor (not shown) can be applied to viewing plate 226, it can be baked out in a vacuum capillary gas passages 221 filled with gas and sealed to complete the device.

When large numbers of gas capillaries are formed during redraw operation, the continuity of the bores may be determined by immersing one end of the tubes in a body of liquid, such as ink, to effect a capillary rise of liquids in all tubes having bore continuity. Moreover, such liquid can be used as an indicator of bore dimensions as well as wall thicknesses.

The tubes need not be redrawn as a unit or as a subunit of a larger panel assembly. In fact, it may be preferred to process the capillary tubes individually. Thus, each tube in an assembly or array may be considered as a single elongated capillary gas chamber or continuum each handled on an individual basis prior to assembly in an array of tubes forming a panel. Individual rectangular capillary tubings are formed, checked for dimensional departures, dielectric strength and then dimensional departures, dielectric strength and parameters and then selected capillaries tipped off or otherwise sealed at one end. These tubes may then be baked out in a vacuum and backfilled with the gaseous discharge medium to any desired gas pressure. Such individual tubes may then be flamed tipped or sealed with a hot wire, for example, to form individual discharge capillaries or ampuls Each ampul or capillary may be of any length desired and of any cross-sectional configuration such as circular or rectangular. For example, a rectangular ampul or capillary may have a thickness of 0.010 inch (10 mils), a width of 0.03. inch (30 mils) with a wall thickness of 0.001 (1 mil), and such dimensions, because of the capillaries being formed from redrawn tubing will be substantially inherently uniform throughout the length thereof so that the critical dielectric thickness and discharge gap parameters will be uniform. Each such ampul or capillary may then be inspected or tested electrically and otherwise prior to assembly in a panel array as an intermediate step in the assembly of the panel. After testing the ampuls or capillaries are arranged on a flat substrate having a conductor array transverse to the long dimension of the ampuls and then secured thereon by adhesive or other securement means with the conductor array being in intimate contact with the outside wall of the ampul. If desired, an array of individual ampuls may be sandwiched between a pair of plates having orthogonally related conductor pattern thereon or a conductor array may simply be printed or otherwise formed on the ampuls or capillaries after assembly into panel arrays.

Although a number of embodiments have been disclosed herein, others will be suggested by the disclosure and all such embodiments as fall within the spirit of the invention are intended to be covered by the claims hereof.

What is claimed is:

1. In a multiple discharge gas display/memory panel of the type in which discrete discharges in a gas under pressure produces charges alternately collectable on surfaces of pairs of opposed dielectric members backed by pairs of conductors carrying operating alternating potentials, a glass structure comprising a plurality of axially coplanar elongated tubular glass capillary tube members formed as a monolayer and simultaneously with each other, a gaseous discharge medium in said tubes, one of said conductors of said pairs being parallel to the bore of a glass tube member, respectively, and the other of said conductor being disposed at the opposite surface of the tubes and at a transverse angle to the first conductors, respectively.

2. The invention defined in claim 1 wherein said parallel tubular members of a set are tubes and wherein the width dimension of the bore of each tube is equal to the lateral width dimension of said conductors, respectively.

3. The invention defined in claim 1 wherein said parallel tubular members are rectangular in cross section and wherein each conductor lying parallel to the bore of a tubular member is greater in lateral dimension than the width of the bore of several of said tubes whereby the bores of several of said tubes lie within the lateral dimension of one of said conductors so that several discharges in the several tubes, respectively, are produced when operating potentials are applied to selected crossing conductors thereof.

4. The invention defined in claim 1 wherein said tubular members are essentially round tubes, the diameter of each bore of each tube is smaller than the width of the conductors paralleling same whereby there are several discharges on application of operating alternating potentials to preselected conductors thereof.

5. The invention defined in claim 4 including solid glass fiber members between adjacent tubular members.

6. The invention defined in claim 1 wherein said tubular members are substantially round tubes.

7. The invention defined in claim 6 including at least one solid glass fiber spacer member between each adjacent tubular member, respectively.

8. The invention defined in claim 7 wherein said solid fiber glass members are smaller in diameter than said tubular members.

9. The invention defined in claim 7 wherein said solid glass fiber spacer members are circular in cross section and joined at their points of tangential contact with a hollow tubular member to form a groove for receiving one of said conductor members, respectively.

10. The invention defined in claim 7 including at least one thin planar support substrate tangentially secured to said monolayer of capillary tubes and said glass fiber spacer members, respectively.

11. The invention defined in claim 10 wherein one of said conductors is on the opposite side of said plate from said tube.